United States Patent
Kondo et al.

(10) Patent No.: US 9,999,917 B2
(45) Date of Patent: Jun. 19, 2018

(54) METHOD FOR COLD-FORGING THIN-WALLED PORTION AND EXPLOSION-PROOF VALVE

(71) Applicant: SMK Corporation, Shigawa-Ku, Tokyo (JP)

(72) Inventors: Haruhiko Kondo, Kanagawa (JP); Ryo Sasaki, Chiba (JP)

(73) Assignee: SMK CORPORATION, Tokyo (JP)

( * ) Notice: Subject to any disclaimer, the term of this patent is extended or adjusted under 35 U.S.C. 154(b) by 555 days.

(21) Appl. No.: 14/526,838

(22) Filed: Oct. 29, 2014

(65) Prior Publication Data
US 2015/0118531 A1   Apr. 30, 2015

(30) Foreign Application Priority Data

Oct. 31, 2013 (JP) .................................. 2013-226287

(51) Int. Cl.
| | |
|---|---|
| *B21J 13/02* | (2006.01) |
| *B21K 23/00* | (2006.01) |
| *H01M 2/04* | (2006.01) |
| *H01M 2/12* | (2006.01) |
| *B21D 22/00* | (2006.01) |

(52) U.S. Cl.
CPC .............. *B21K 23/00* (2013.01); *B21J 13/02* (2013.01); *H01M 2/0486* (2013.01); *H01M 2/1241* (2013.01); *B21D 22/00* (2013.01)

(58) Field of Classification Search
CPC . B21K 1/20; B21K 23/00; B21J 13/02; B21D 28/02; B21D 28/10; B21D 28/16;
(Continued)

(56) References Cited

U.S. PATENT DOCUMENTS 3,781,971 A * 1/1974 Middleton ............. B21D 53/04
228/116
3,993,010 A * 11/1976 Taniuchi ............... B21D 51/383
413/12
(Continued)

FOREIGN PATENT DOCUMENTS

| | | |
|---|---|---|
| JP | 57-25225 A | 2/1982 |
| JP | H09-108756 A | 4/1997 |

(Continued)

OTHER PUBLICATIONS

First Office Action issued in corresponding Chinese Application No. 201410573739.1, dated Jan. 21, 2016 (11 pages).
(Continued)

*Primary Examiner* — Edward Tolan
(74) *Attorney, Agent, or Firm* — Osha Liang LLP (57) ABSTRACT

A method for cold-forging a thin-walled portion by which a thin-walled portion having a set thickness is formed directly from a metal base plate having a sufficiently large thickness and an explosion-proof valve are provided. Blade side surfaces of upper and lower dies for shearing the metal base plate are set in an overlapping manner with a predetermined clearance δ therebetween. Sheared surfaces are formed with the blade side surfaces of the upper and lower dies in the metal base plate along a processing direction while leaving the set thickness t2 therebetween and the metal base plate is compressed by the overlapped portions until work-hardened to form the thin-walled portion with the horizontal width δ and the set thickness t2 between the sheared surfaces. The formation of the sheared surfaces eliminates a need to press portions of the metal base plate positioned at both the sides of the thin-walled portion into both the sides during the processing of the thin-walled portion and the thin-walled portion can thus be formed at a high compression processing rate with a smaller processing load.

7 Claims, 6 Drawing Sheets

(58) Field of Classification Search
CPC ........ B21D 22/00; B21D 22/02; B21D 22/06; H01M 2/1241; H01M 2/0486
See application file for complete search history.

(56) References Cited

U.S. PATENT DOCUMENTS

| | | | | |
|---|---|---|---|---|
| 4,477,537 | A * | 10/1984 | Blase | B21D 28/16 428/577 |
| 5,458,717 | A * | 10/1995 | Kurita | B21D 28/16 156/250 |
| 8,015,851 | B2 * | 9/2011 | Sasaki | B21D 28/10 72/332 |
| 8,113,030 | B2 * | 2/2012 | Fujimura | B21D 28/10 72/324 |
| 2006/0277961 | A1 * | 12/2006 | Miyahara | B21D 28/02 72/327 |

FOREIGN PATENT DOCUMENTS

| | | |
|---|---|---|
| JP | 2000-021380 A | 1/2000 |
| JP | 2012-109222 A | 6/2012 |
| JP | 57-25225 B2 | 5/2015 |

OTHER PUBLICATIONS

Office Action dated Sep. 1, 2015 in corresponding Japanese Patent Application No. 2013-226287 (with translation) (9 pages).

* cited by examiner

METHOD FOR COLD-FORGING THIN-WALLED PORTION AND EXPLOSION-PROOF VALVE

This application claims the benefit of J.P. Patent Application No. 2013-226287, filed Oct. 31, 2013, which is incorporated herein by reference in its entirety.

FIELD

The present invention relates to a method for cold-forging a thin-walled portion by which a thin-walled portion is formed by compressing a portion of a metal base plate until work-hardened between upper and lower dies and an explosion-proof valve. More specifically, the present invention relates to a method for cold-forging a thin-walled portion by which a thin-walled portion having a set thickness sufficiently smaller than a thickness of a metal base plate is formed in a portion of the metal base plate and an explosion-proof valve.

BACKGROUND

In a secondary battery such as a lithium-ion battery, a lid body made of a metal plate is welded to a circumference of an opening of a battery case containing an electrolyte therein in order to cover the opening of the battery case. In recent years, such a secondary battery is being used in an application to be mounted in a hybrid car or the like. Accordingly, reducing the weight of such a secondary battery is desired and the lid body conventionally made of a stainless steel is therefore formed now from a metal plate made of an aluminum alloy. The aluminum alloy, however, has a modulus of longitudinal elasticity smaller than that of the stainless steel and such a lid body is therefore more likely to bend outwardly due to an internal pressure thereagainst. Thus, the lid body needs to ensure a rigidity thereof by having a given thickness or greater. Furthermore, in order to completely seal the battery case so as to prevent a liquid leakage and in order to firmly fix the lid body to the battery case by means of welding, a welding margin with the battery case needs to be provided as long as possible in the lid body along a thickness direction thereof. For these reasons, the thickness of the lid body made of the aluminum alloy is set at about 1 mm.

On the other hand, the secondary battery has a risk of explosion due to an abnormal rise in an internal pressure inside the battery by heat or impact. Accordingly, an explosion-proof valve which will be broken at a predetermined internal pressure is formed beforehand in a portion of the lid body. The explosion-proof valve is edged with a thin-walled portion having a thickness smaller than that of the metal plate forming the lid body therearound. The thickness of the thin-walled portion is set so as to be broken when an internal pressure in the battery case is increased to the set internal pressure. In order to cause the breaking of the thin-walled portion at an internal pressure of 0.7 to 1 MPa, for example, the thickness of the thin-walled portion is set at 30 μm.

Figure 11:
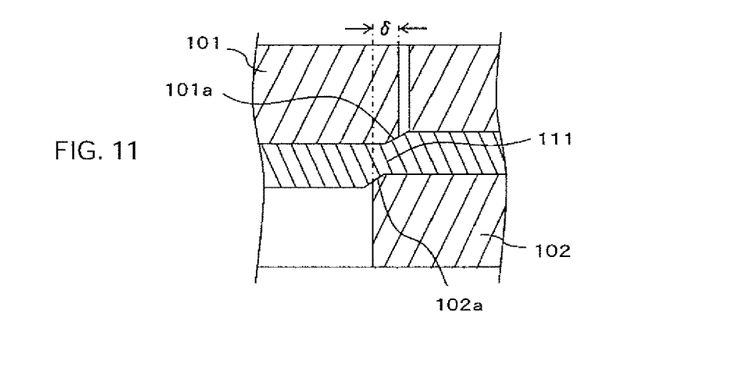
FIG. 11 is an enlarged cross-sectional view of a main part of the conventional first processing method.

As a processing method for forming a thin-walled portion having a set thickness in a portion of a metal base plate having a predetermined thickness, a processing method (first processing method) as follows has been conventionally known (Patent Literature 1). Specifically, as shown in FIG. 11, upper and lower dies 101 and 102 are set in an overlapping manner with a predetermined clearance δ therebetween. A metal base plate 110 is subjected to press processing by the upper and lower dies 101 and 102 with overlapped shoulder portions 101a and 102a being used as curved surfaces R for extrusion molding. The thin-walled portion 111 is thus formed while pushing out a metal material in the portion subjected to the press processing toward both sides thereof.

Figure 12:
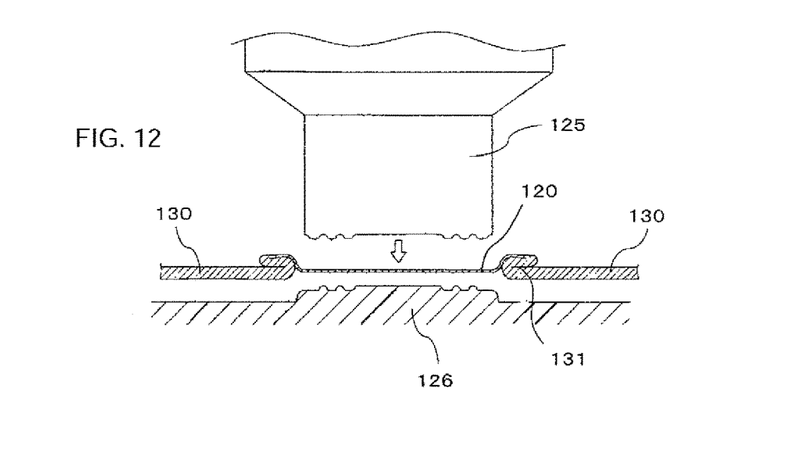
FIG. 12 is a cross-sectional view of a main part of the conventional second processing method.

As another processing method for forming a thin-walled portion having a set thickness in a portion of a metal base plate, a processing method (second processing method) as follows has also been known (Patent Literature 2). Specifically, as shown in FIG. 12, a metal base plate 120 is placed on a flat portion of a lower die 126. Sharpened blades of an upper die 125 each machined in a V-letter shape are pressed into the metal base plate 120 from above, thereby forming thin-walled portions 121 and 122 having a set thickness at lowermost ends of resultant recessed grooves each formed to have a V letter-shaped cross section.

Figure 13:
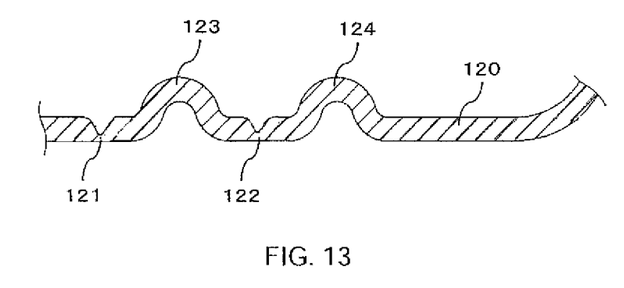
FIG. 13 is an enlarged cross-sectional view of a main part illustrating the thin-walled portions 121 and 122 formed by the second processing method.

The second processing method is a processing method for forming a thin-walled portion having a set thickness in an explosion-proof valve in a battery case lid made of an aluminum alloy plate. A first thin plate portion 120 having a thickness of 0.3 mm is formed by stretching a portion of a lid body 130 made of an aluminum alloy and having a thickness of 1 to 3 mm. The first thin plate portion 120 is interposed between the punch 125 and the die 126 having V letter-shaped protrusions, thereby forming the thin-walled portions 121 and 122 having a set thickness of about 50 μm in the first thin plate portion 120 (see FIG. 13). Excess portions of the first thin plate portion 120 resulting from pressing the V letter-shaped protrusions therein are pushed out toward release portions 123 and 124 at both the sides thereof.

CITATION LIST

Patent Literature

Patent Literature 1: Japanese Patent Application Laid-Open No. Hei. 9-108756
Patent Literature 2: Japanese Patent Application Laid-Open No. 2012-109222

SUMMARY

Technical Problem

In either of the above-described first and second processing methods, however, the thin-walled portion is processed by pressing the excess portions at both the sides of the area to be the thin-walled portion into the portions of the metal plate at both the sides thereof. Accordingly, as the thickness of the metal base plate before the processing is increased, the deformation resistance caused by the pressing of the excess portions into the portions at both the sides of the thin-walled portion is increased. Thus, a limit processing load under which the processing dies may be possibly damaged is soon reached.

Therefore, even in either of the above-described processing methods, in order to form a thin-walled portion having a set thickness t2, the thin-walled portion must be processed into from a metal base plate having a thickness t1 which is at least less than 10 times the set thickness t2. For example, according to the first processing method, a metal plate for forming a thin-walled portion having a set thickness t2 in a range of 35 to 65 μm has a thickness t1 in a range of 0.15 to 0.25 mm. Such a thin-walled portion cannot be processed into from a metal plate having a thickness equal to or greater than 0.35 mm. According to the second conventional processing method, the thickness t1 of a metal plate for forming a thin-walled portion having the set thickness t2 of about 50 μm is 0.3 mm. Such a thin-walled portion cannot be processed into from a metal plate having a thickness equal to or greater than 0.5 mm.

According to the second processing method for processing the thin-walled portions 121 and 122 in portions of the lid body in order to form the explosion-proof valve in the lid body, the set thickness t2 of the thin-walled portions 121 and 122 is set at about 50 μm in order to allow the thin-walled portions 121 and 122 to be broken at a predetermined internal pressure in the battery case. The thickness of the lid body 130, on the other hand, needs to be at least 1 mm or greater for a sufficient strength as the lid body as well as for the need to provide the welding margin with the battery case, which has a given length, along the thickness direction thereof as described above. Thus, the thin-walled portions 121 and 122 cannot be processed directly from the lid body 130. A portion of the lid body 130 is interposed between the punch and the die and stretched in order to form the first thin plate portion 120 having a thickness of 0.3 mm from the lid body. After an excess portion resulting from the stretching is subjected to leveling, the thin-walled portions 121 and 122 having a set thickness of about 50 μm are formed from the first thin plate portion 120 having a thickness of 0.3 mm.

Furthermore, the excess portions generated when forming the first thin plate portion 120 and the thin-walled portions 121 and 122 need to be absorbed in portions of the lid body 130 and the first thin plate portion 120. Thus, a step of forming recessed portions for housing the release portions 123 and 124 on a processing surface of the punch 125, a folding step of forming a plurality of folded portions 131 in the lid body, and the like, are required. Since a plurality of such complicated processing steps other than the processing of the thin-walled portions are required, the processing cost is increased. Also, since irregularities due to the folded portions are formed on the surface of the lid body, the appearance of the lid body is degraded and there is a risk of hurting a finger or the like.

In view of the above, the thin-walled portion of the explosion-proof valve is typically formed from a metal plate different from the lid body and the metal plate in which the explosion-proof valve is formed is fixed to the lid body by welding. However, this requires another complicated welding step of firmly joining the metal plate in which the explosion-proof valve is formed and the lid body together in order to prevent a liquid leakage from the battery case and to prevent the breaking thereof at a predetermined internal pressure. Thus, the processing cost is increased as well.

Moreover, by either of the above-described first and second processing methods, the thin-walled portion having the set thickness t2 cannot be formed with high accuracy. For example, according to the first processing method, the thin-walled portion is formed between the shoulder portions 101a and 102a of the upper and lower dies 101 and 102 each having the curved surface R. Thus, even if the curved surface R is formed with high accuracy, even a slight error in the clearance δ generated between the upper and lower dies 101 and 102 leads to an error in the thickness of the thin-walled portion 111. Moreover, in order to smoothly push out the excess portion of the metal base plate 110 toward both the sides with the curved surfaces R of the shoulder portions 101a and 102a, an oil is applied to the front and rear surfaces of the metal base plate 110 before the press forming. The oil, however, is not pushed out toward both the sides integrally with the metal base plate 110. Thus, unevenness is generated in an amount of the oil left between the thin-walled portion 111 and the shoulder portions 101a and 102a, thereby leading to an error in the thickness of the thin-walled portion 111.

According to the second processing method, when processing the thin-walled portions 121 and 122, the excess portions bulging at both the sides thereof are pushed out into the release portions 123 and 124. However, the excess portions left between the release portions 123 and 124 and the thin-walled portions 121 and 122 remain in a gap between the punch 125 and the die 126. Thus, the stroke of pushing down the punch 125 cannot be controlled precisely and the thin-walled portions 121 and 122 having the set thickness therefore cannot be processed with high accuracy.

Particularly when the explosion-proof valve having the thin-walled portion which will be broken at a set internal pressure is formed in the lid body of the battery case, which is made of an aluminum alloy in order to reduce the weight thereof, the set thickness t2 of the thin-walled portion needs to be about 50 μm. However, the internal pressure at which the thin-walled portion is broken is greatly varied depending on the thickness thereof. Thus, a tolerance of several micrometers is required. According to the first and second processing methods, it is extremely difficult to manufacture the thin-walled portion having a thickness within this tolerance on a steady basis, thereby resulting in a poor manufacturing yield.

Furthermore, when processing the thin-walled portions 121 and 122 of the explosion-proof valve by the second processing method, corrugated portions or folded portions are formed by the excess portions at both the sides of the thin-walled portions 121 and 122. If an internal pressure in the battery case is increased, these portions are bent, thereby causing the thin-walled portions 121 and 122 to be inclined with respect to an internal pressure application direction (vertical direction). Consequently, even if the thin-walled portions are formed to have the set thickness within the tolerance, there is a risk that those thin-walled portions may not be broken at the set internal pressure.

The present invention has been made in view of such conventional problems. It is an object of the present invention to provide a method for cold-forging a thin-walled portion by which a thin-walled portion having a set thickness is formed directly from a sufficiently thick metal base plate.

It is another object of the present invention to provide a method for cold-forging a thin-walled portion by which a thin-walled portion having a set thickness is formed with high accuracy from a metal base plate.

It is yet another object of the present invention to provide a method for cold-forging a thin-walled portion by which a thin-walled portion is formed with high accuracy from a lid body for covering a battery case and required to have a given thickness. Furthermore, it is still yet another object of the present invention to provide an explosion-proof valve.

Solution to Problem

In order to achieve the above-described objects, according to a first aspect of the present invention, a method for cold-forging a thin-walled portion, by which a metal base plate having a thickness t1 is subjected to press processing by upper and lower dies to form a thin-walled portion having a set thickness t2 sufficiently smaller than the thickness t1 in a portion of the metal base plate, includes:

setting blade side surfaces of the upper and lower dies for shearing the metal base plate in an overlapping manner with a predetermined clearance δ therebetween in a horizontal direction and setting the metal base plate having the thickness t1 between the upper and lower dies; then applying a processing load P between the upper and lower dies to form sheared surfaces with the blade side surfaces of the metal base plate along a processing direction while leaving the set thickness t2 therebetween; and compressing the metal base plate by overlapped portions of the upper and lower dies until work-hardened to form the thin-walled portion having a horizontal width δ and the set thickness t2 between the sheared surfaces.

The metal base plate having the thickness t1 is sheared with the blade side surfaces of the upper and lower dies overlapped with each other with the predetermined clearance δ therebetween to form the sheared surfaces while leaving the set thickness t2 therebetween. Portions of the metal base plate at both the sides of an area where the upper and lower dies are overlapped with each other will not be excess portions necessary to be pushed out toward both the sides of the thin-walled portion. Thus, without significantly increasing the deformation resistance when compressing the metal base plate having the thickness t1 into the thin-walled portion having the sufficiently thin set thickness t2, the thin-walled portion with a high compression processing rate is formed with the processing load P equal to or smaller than a limit processing load Pmax to prevent the damage of the upper and lower dies.

The method for cold-forging a thin-walled portion according to a second aspect of the present invention further includes: obtaining a minimum clearance δmin not to cause breaking of the thin-walled portion under the processing load P used when processing the metal base plate having the thickness t1 into the set thickness t2; and setting the clearance δ at a clearance δms with a length at least longer than the minimum clearance δmin and close to the minimum clearance δmin.

As the clearance δ over which the upper and lower dies are overlapped with each other is reduced, the volume of the excess portion generated when forming the thin-walled portion having the set thickness t2 from the metal base plate having the thickness t1 is reduced. Thus, the thin-walled portion having the set thickness t2 can be formed with a smaller processing load P. With the clearance δ equal to or smaller than the minimum clearance δmin, on the other hand, there is a risk that the metal base plate being compressed by the overlapped portions of the upper and lower dies may be broken under the processing load P before being compressed into the set thickness t2. If the clearance δ is set at the clearance δms with a length at least longer than and close to the minimum clearance δmin, the thin-walled portion having the set thickness t2 can be formed with a smaller processing load.

The method for cold-forging a thin-walled portion according to a third aspect of the present invention further includes: if it is possible to process the metal base plate having the thickness t1 into the set thickness t2 with a tested processing load Pt equal to or smaller than a limit processing load Pmax applied between the upper and lower dies, obtaining the minimum clearance δmin from:

$$\delta min = t2 \cdot (\tau t^2 / \tau max^2 - 1)^{1/2} \quad \text{Expression (1)}$$

wherein τt denotes a shear stress generated along a vertical plane of the thin-walled portion having the thickness t2 due to the tested processing load Pt and τmax denotes a shear strength of the metal base plate.

The set thickness t2 and the shear strength τmax of the metal base plate are known values. τt can be obtained from Pt/Sv wherein Pt denotes the tested processing load obtained by an actual measurement and Sv denotes a longitudinal sectional area of the vertical plane of the thin-walled portion having the thickness t2 along the processing direction of the tested processing load Pt. Thus, from Expression (1):

$$\delta min = t2^2 \cdot (\tau t^2 / \tau max^2 - 1)^{1/2},$$

the minimum clearance δmin capable of reliably processing the thin-walled portion having the set thickness t2 under the tested processing load Pt without causing the breaking thereof is obtained.

The method for cold-forging a thin-walled portion according to a fourth aspect of the present invention further includes: setting the clearance δ used when the metal base plate having the thickness t1 is processed into the set thickness t2 with the tested processing load Pt as a maximum clearance δmax; and setting the clearance δ between the minimum clearance δmin and the maximum clearance δmax.

The upper and lower dies are overlapped with each other with a clearance δs shorter than the maximum clearance δmax. Thus, the metal base plate having the thickness t1 can be compressed into the set thickness t2 with the processing load P equal to or smaller than the limit processing load Pmax. Moreover, since the clearance δs is longer than the minimum clearance δmin not to cause the breaking of the thin-walled portion under the processing load P used when processing the metal base plate having the thickness t1 into the set thickness t2, the thin-walled portion can be processed to have the set thickness t2 without causing the breaking thereof.

The method for cold-forging a thin-walled portion according to a fifth aspect of the present invention further includes: forming a lid body for covering an opening of a battery case for hermetically containing an electrolyte therein from the metal base plate having the thickness t1 and forming at least a portion of an outline of an explosion-proof valve formed in a portion of the lid body by the thin-walled portion; and setting the set thickness t2 of the thin-walled portion at a thickness to allow the thin-walled portion to be broken when an internal pressure in the battery case is increased to a predetermined abnormal value.

The thin-walled portion of the explosion-proof valve having the set thickness t2 set to be broken at the predetermined abnormal value can be formed from the lid body of the battery case with the thickness t1 equal to or greater than ten times the set thickness t2 by a single cold-forging step. Since the lid body has a sufficiently large thickness t1, the lid body is prevented from bending due to an internal pressure in the battery case. Also, since the welding margin with the battery case, which has a sufficient length, can be formed in the lid body, the lid body can be firmly fixed to the battery case and the battery case can be thereby sealed.

Moreover, since the thin-walled portion of the explosion-proof valve can be formed to have the set thickness t2 with high accuracy, the explosion-proof valve which will be reliably broken at the set internal pressure can be manufactured at a high yield.

In the method for cold-forging a thin-walled portion according to a sixth aspect of the present invention, the thin-walled portion is formed with a width of the clearance δ along a closed loop in a virtual circular region with a diameter thereof being a short-side width of the lid body and a length of the closed loop is longer than a circumference of the virtual circular region.

The explosion-proof valve is formed in the limited virtual circular region in the lid body. Thus, with the processing load P being the same, the maximum shear stress TO generated in the thin-walled portion formed along the closed loop is smaller than that generated in the thin-walled portion formed along the outline of a true circle in the virtual circular region. Therefore, with the processing load P being the same, even if the clearance δ is reduced, the thin-walled portion will not be broken by the processing load P.

In the method for cold-forging a thin-walled portion according to a seventh aspect of the present invention, the metal base plate is made of an aluminum alloy.

Since the lid body is made of the aluminum alloy, the weight of such a secondary battery can be reduced.

Even when the lid body is made of the aluminum alloy having a relatively low modulus of longitudinal elasticity E, the thickness t1 thereof can be set sufficiently thick. Thus, the lid body is less likely to bend outwardly due to an internal pressure thereagainst.

In the method for cold-forging a thin-walled portion according to an eighth aspect of the present invention, an outer surface of the explosion-proof valve formed so as to protrude toward an outer side of the battery case from the thin-walled portion is exposed on the same plane as or on an inner side than an outer surface of the lid body surrounding a ring recessed portion formed around the explosion-proof valve via the ring recessed portion interposed therebetween.

Since the explosion-proof valve is formed so as to protrude toward the outer side of the battery case from the thin-walled portion, the explosion-proof valve is arranged in a direction along which the breaking thereof occurs more easily upon the receipt of the internal pressure in the battery case.

Since the outer periphery of the explosion-proof valve is not protruded outwardly from the outer periphery of the lid body, a finger or an extraneous material is less likely to touch the explosion-proof valve.

An explosion-proof valve according to a ninth aspect of the present invention is integrally formed with a lid body for covering an opening of a battery case for hermetically containing an electrolyte therein and formed from a metal base plate having a thickness t1 via a thin-walled portion having a set thickness t2 sufficiently smaller than the thickness t1 and set to be broken when an internal pressure in the battery case is increased to a predetermined abnormal value. The thin-walled portion is formed by: setting upper and lower dies such that the lid body is interposed between blade side surfaces thereof in an overlapping manner with a predetermined clearance δ therebetween in a horizontal direction; applying a processing load P in a vertical direction between the upper and lower dies so as to shear the lid body with the blade side surfaces while leaving the set thickness t2 therebetween to thereby form sheared surfaces; and cold-forging the lid body between the sheared surfaces with overlapped portions of the upper and lower dies so as to have the set thickness t2.

If the processing load P in the vertical direction is applied between the upper and lower dies between which the lid body is interposed, the blade side surfaces of the upper and lower dies overlapped with each other with the predetermined clearance δ therebetween shear the lid body having the thickness t1 and form the sheared surfaces while leaving the set thickness t2 therebetween. Between the sheared surfaces, the upper and lower dies compress the lid body with the overlapped portions thereof and thereby cold-forge the thin-walled portion having the set thickness t2. Portions of the lid body at both the sides of the overlapped portion will not be excess portions necessary to be pushed out toward both the sides of the thin-walled portion. Thus, without significantly increasing the deformation resistance when compressing the lid body having the thickness t1 into the thin-walled portion having the sufficiently thin set thickness t2, the thin-walled portion with a high compression processing rate can be formed with the processing load P equal to or smaller than the limit processing load Pmax to prevent the damage of the upper and lower dies.

In the explosion-proof valve according to a tenth aspect of the present invention, the thin-walled portion is formed with a width of the clearance δ along a closed loop in a virtual circular region with a diameter thereof being a short-side width of the lid body and a length of the closed loop is longer than a circumference of the virtual circular region.

The explosion-proof valve is formed in the limited virtual circular region in the lid body. Thus, with the processing load P being the same, the maximum shear stress TO generated in the thin-walled portion formed along the closed loop is smaller than that generated in the thin-walled portion formed along the circular outline in the virtual circular region. Therefore, with the processing load P being the same, even if the clearance δ is reduced, the thin-walled portion will not be broken by the processing load P.

Advantageous Effects of Invention

According to the first aspect of the present invention, without altering, to a large extent, the configuration of the upper and lower dies of the press forming machine for shearing the metal base plate, the thin-walled portion with a high compression processing rate can be formed from a portion of the metal base plate only by changing the clearance between the upper and lower dies.

Moreover, since the thin-walled portion is forged while shearing both the sides of the area to be the thin-walled portion by the blade side surfaces of the upper and lower dies, the volume of the excess portion necessary to be pressed into the portions of the metal base plate lateral to the thin-walled portion with the dies is small. Thus, the thin-walled portion can be formed with the low processing load P.

Moreover, since the thickness of the thin-walled portion to be cold-forged can be controlled only by the strokes of the upper and lower dies in the vertical direction, the thin-walled portion having the set thickness t2 can be processed with high accuracy.

Even when an oil is applied to the front and rear surfaces of the metal base plate before the cold-forging thereof is performed, an amount of the oil pushed out toward both the sides of the processing region by the upper and lower dies is a substantially fixed amount. Thus, the thin-walled portion having the set thickness t2 can be processed with high accuracy by taking the thickness of the oil left in the thin-walled portion into consideration.

According to the second aspect of the present invention, the thin-walled portion having the sufficiently thin set thickness t2 can be formed from the metal base plate having the thickness t1 with the low processing load P. With the processing load P being the same, the thin-walled portion having the set thickness t2 can be formed from the metal base plate having a larger thickness t1.

According to the third aspect of the present invention, even when a true breaking limit clearance δlim, which is a boundary value not to cause the breaking of the thin-walled portion, cannot be obtained, the minimum clearance δmin to reliably prevent the breaking of the thin-walled portion can be obtained from the shear strength τmax of the metal base plate and the set thickness t2, which are known values, and the shear stress τt generated along the vertical plane of the thin-walled portion having the thickness t2 due to the measurable tested processing load Pt.

According to the fourth aspect of the present invention, the clearance δ with which there is no risk of damaging the upper and lower dies and the thin-walled portion having the set thickness t2 can be processed without causing the breaking thereof can be selected as desired from among a given range depending on the processing conditions thereof.

According to the fifth aspect of the present invention, the thin-walled portion having the set thickness t2 can be integrally formed from the metal base plate having the thickness t1 which is equal to or greater than ten times the set thickness t2. Thus, the thin-walled portion of the explosion-proof valve can be formed by the single cold-forging step from the lid body of the battery case required to have a thickness equal to or greater than ten times that of the thin-walled portion.

Moreover, since the thin-walled portion having the set thickness t2 of the explosion-proof valve can be formed with high accuracy, the explosion-proof valve which will be reliably broken at the set internal pressure can be formed.

According to the sixth and tenth aspects of the present invention, the explosion-proof valve is formed in the limited virtual circular region in the lid body. Thus, the explosion-proof valve does not disrupt the arrangement of other components such as electrodes on the lid body.

The thin-walled portion formed in the limited virtual circular region is less likely to break during the cold-forging step.

According to the seventh aspect of the present invention, the lid body of the battery case can achieve a reduction in weight without bending outward upon the receipt of an internal pressure thereagainst.

According to the eighth aspect of the present invention, even when the explosion-proof valve is disposed in the direction along which the breaking of the explosion-proof valve occurs more easily upon the receipt of the internal pressure in the battery case, no finger or extraneous material touches the explosion-proof valve, thereby eliminating a risk of an injure or a damage.

According to the ninth aspect of the present invention, the thin-walled portion having the set thickness t2 set to be broken at the predetermined abnormal value can be formed by the single cold-forging step from the lid body of the battery case having the thickness t1 equal to or greater than ten times the set thickness t2. Since the lid body has such a sufficiently large thickness t1, the lid body is prevented from bending due to the internal pressure in the battery case. Also, since the welding margin with the battery case, which has a sufficient length, can be formed in the lid body, the lid body can be firmly fixed to the battery case and the battery case can thereby be sealed.

DESCRIPTION OF EMBODIMENTS

A method 1 for cold-forging a thin-walled portion according to an embodiment of the present invention and an explosion-proof valve 12 according to an embodiment of the present invention formed by the cold-forging method 1 will be described below with reference to FIGS. 1 to 10. In the present embodiment, from a metal base plate 4 forming a lid body 10 and having a thickness t1, a thin-walled portion 11 having a set thickness t2 sufficiently smaller than the thickness t1 is cold-forged along a periphery of the explosion-proof valve 12 formed at a center of the lid body 10 for covering an opening 14a of a battery case 14. The thin-walled portion 11 is cold-forged by utilizing upper and lower dies 2 and 3 used for cutting the metal base plate 4 by press processing.

Figure 9:
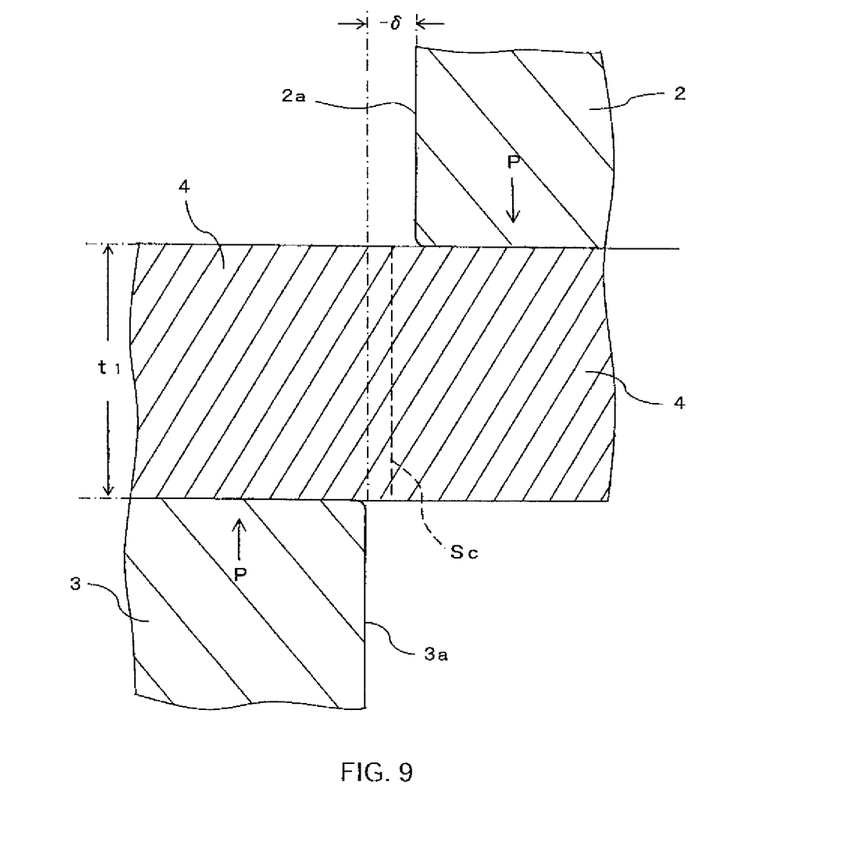
FIG. 9 is an enlarged cross-sectional view of a main part of press processing during which the metal base plate 4 is set between the punch 2 and the die 3 and cut.

When cutting the metal base plate 4 along a predetermined cut surface Sc with the upper and lower dies 2 and 3, the upper and lower dies 2 and 3 are disposed in a crossed arrangement such that a blade side surface 3a of the die 3 serving as the lower die and a blade side surface 2a of the punch 2 serving as the upper die are disposed along the cut surface Sc as shown in FIG. 9. Thereafter, the punch 2 is pushed downwardly from above the metal base plate 4 placed on the die 3 so as to generate a shear stress exceeding a shear strength of the metal base plate 4 along the cut surface Sc and thereby break the metal base plate 4 along the cut surface Sc.

In this shear processing of the metal base plate 4, if part of the die 3 is overlapped with part of the punch 2 in a vertical direction, the thin-wall portion obtained by compressing a portion of the metal base plate 4 between the overlapped portions of the die 3 and the punch 2 is left on the cut surface Sc as what is called burr. Therefore, the punch 2 is generally disposed above the die 3 such that the blade side surface 3a of the die 3 and the blade side surface 2a of the punch 2 have a minute clearance (−δ) therebetween in a horizontal direction.

In contrast, the die 3 and the punch 2 for performing the shear processing of the metal base plate 4 are overlapped to have a predetermined clearance δ therebetween according to the present embodiment. The metal base plate 4 is then subjected to compression processing by the overlapped portions to form the thin-walled portion 11. A metal used as a material of the metal base plate 4, however, does not change its volume in a plastic deformation region after the volume thereof has been reduced generally up to 80% of the original volume in a compressed elastic region. Thus, an excess portion of the metal base plate 4 resulting from the formation of the thin-walled portion between the overlapped portions of the die 3 and the punch 2 must be pushed out into portions of the metal base plate 4 at both the sides thereof during the compression processing. Consequently, the deformation resistance when being compressed into the thin-walled portion 11 is increased, thereby increasing a processing load P to be applied between the die 3 and the punch 2 and possibly resulting in a damage of the upper and lower dies 2 and 3. Thus, the die 3 and the punch 2 for performing the shear processing are generally not employed in the compression processing to form the thin-walled portion 11.

The volume of the excess portion is proportional to the clearance δ over which the die 3 is overlapped with the punch 2. Therefore, if the clearance δ is reduced, the processing load for pushing out the excess portion toward both the sides thereof can also be reduced. However, if the clearance δ is equal to or smaller than a given length, the thin-walled portion will be broken due to the processing load when being processed into the thin-walled portion.

Figure 10:
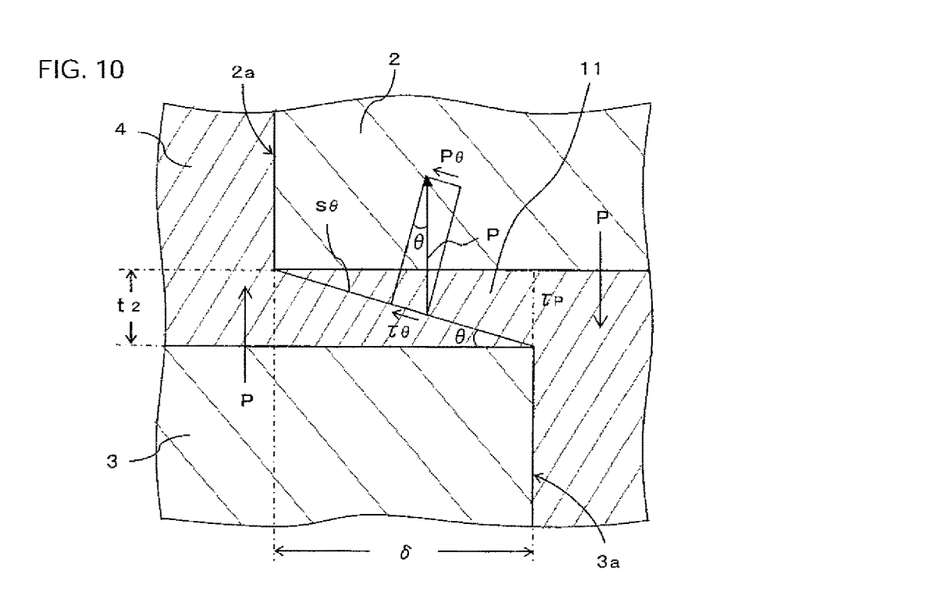
FIG. 10 is an explanatory diagram illustrating a shear stress TO generated in the thin-walled portion 11 due to a processing load P.

This will be explained with reference to FIG. 10 which is an explanatory diagram illustrating the processing load P applied on the thin-walled portion 11. When the metal base plate 4 is compressed into the thin-walled portion 11 having the set thickness t2 by pushing the punch 2 downwardly toward the die 3 with the processing load P, the processing load P directed downwardly from the punch 2 is acted upon the thin-walled portion 11 along the right side of the blade side surface 3a in the figure. At the same time, a reaction force P directed upwardly from the die 3 and corresponding to the processing load P is acted upon the thin-walled portion 11 along the left side of the blade side surface 2a. A maximum shear stress t0 generated in the thin-walled portion 11 due to such processing loads P acted in the opposite directions is thought to be generated along a cross-section Sθ along a diagonal line of the thin-walled portion 11. Therefore, the maximum shear stress τθ is represented by:

$$\tau\theta = \tau p \cdot t2/((t2)^2 + \delta^2)^{1/2} \qquad \text{Expression (2)}$$

wherein t2 denotes a thickness of the thin-walled portion 11; δ denotes a clearance over which the die 3 is overlapped with the punch 2 in the vertical direction (the width of the thin-walled portion 11 in the horizontal direction); and τp denotes a shear stress due to the processing load P along a longitudinal section of the thin-walled portion 11 in the processing direction.

The shear stress τp is represented by P/Sv wherein Sv denotes an area of the longitudinal section of the thin-walled portion 11 in the processing direction (herein, a product of a length l along the periphery of the explosion-proof valve 12 and the set thickness t2). The shear stress τp is therefore proportional to the processing load P. Thus, when the shear stress τθ exceeds a shear strength τmax of the metal base plate, i.e., when $$\tau\theta = \tau p * t2/((t2)^2 + \delta^2)^{1/2} \geq \tau\max \qquad \text{Expression (3),}$$

the thin-walled portion 11 is broken due to the processing load P applied on the thin-walled portion 11.

If the processing target set thickness t2 of the thin-walled portion 11 is constant, the processing load P used when compressing into the thin-walled portion 11 and the shear stress τp generated by the processing load P are also constant. Therefore, in Expression (3), when the thin-walled portion 11 having the same set thickness t2 is processed, as the clearance δ between the upper and lower dies 2 and 3 is decreased, the shear stress τθ generated in the thin-walled portion 11 is increased. When the clearance δ is equal to or smaller than a breaking limit clearance δlim satisfying:

$$t2 \cdot (\tau p^2/\tau\max^2 - 1)^{1/2} = \delta\lim \qquad \text{Expression (4),}$$

the shear strength max is exceeded, thereby causing the breaking of the thin-walled portion 11.

From the above, it has been believed that it is difficult to cold-forge the thin-walled portion 11 directly from the metal base plate 4 whether the clearance δ over which the press forming dies 2 and 3 for performing the shear processing on the metal base plate are overlapped with each other is increased or decreased. In particular, it has been believed that it is impossible to obtain the thin-walled portion 11 by means of the compression processing from the metal base plate 4 having the thickness t1 whose compression processing rate (a rate represented by 100·(t1−t2)/t1 wherein t1 denotes the thickness of the metal base plate before being subjected to the compression processing and t2 denotes the processing target set thickness of the thin-walled portion 11) will be 90% or greater since the volume of the excess portion is increased and the processing load P is thereby increased.

However, the inventor of the present application repeatedly conducted a variety of experiments and found that if a clearance δs over which the upper and lower dies 2 and 3 are overlapped with each other is set between a maximum clearance δmax capable of processing the metal base plate 4 having the thickness t1 into the thin-walled portion 11 having the set thickness t2 with the processing load P equal to or smaller than a limit processing load Pmax applied between the upper and lower dies 2 and 3 and a minimum clearance δmin not to cause the breaking of the thin-walled portion 11 under the processing load P used when processing the thin-walled portion 11 having the set thickness t2, the thin-walled portion 11 with a compression processing rate at 90% or greater can be processed with the processing load P equal to or smaller than the limit processing load Pmax. This finding has led to complete the present invention.

A method for setting the clearance δs between the upper and lower dies 2 and 3 capable of cold-forging the thin-walled portion 11 having the set thickness t2 (where the compression processing rate thereof is 90% or greater) from the metal base plate 4 having the thickness t1 will be described below.

Figure 5:
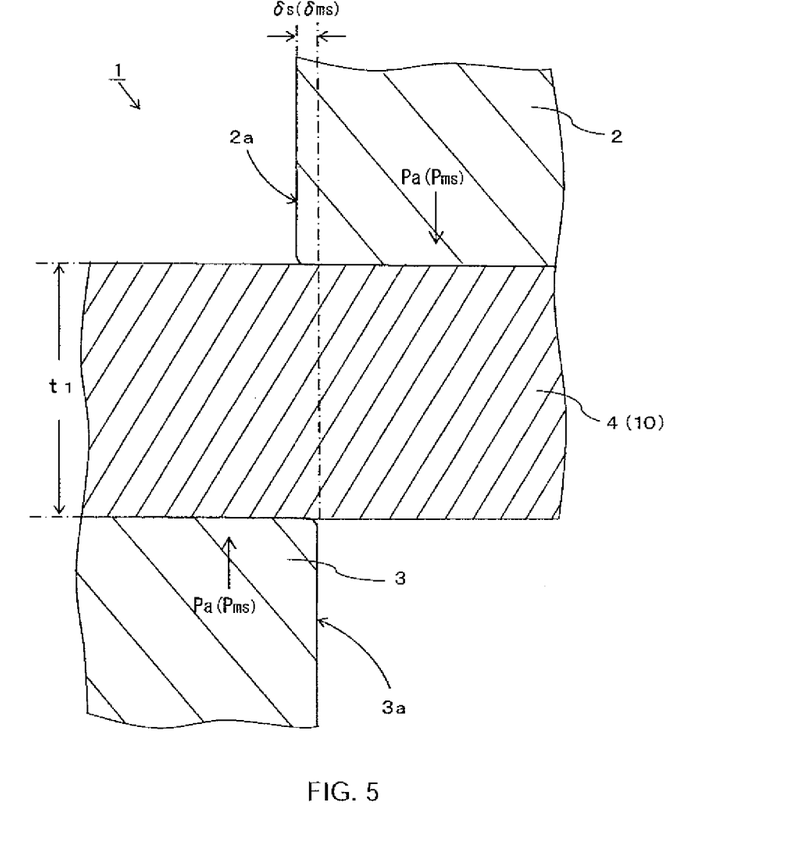
FIG. 5 is an enlarged cross-sectional view of a main part of the method 1 for cold-forging a thin-walled portion, illustrating a state in which a metal base plate 4 is set between a punch 2 and a die 3.

(A) First of all, the die 3 and the punch 2 are disposed in a crossed arrangement such that the blade side surface 3a of the die 3 serving as the lower die and the blade side surface 2a of the punch 2 serving as the upper die are overlapped with each other in the vertical direction with a predetermined clearance δs therebetween as shown in FIG. 5. The metal base plate 4 is disposed between the die 3 and the punch 2. A predicted processing load Pa slightly smaller than the limit processing load Pmax under which the upper and lower dies 2 and 3 may be damaged is applied on the punch 2 in a direction toward the die 3 positioned down below. Whether or not the metal base plate having the thickness t1 can be processed into the thin-walled portion 11 having the set thickness t2 is thereby tested.

(B) When it is possible to be processed into the thin-walled portion having the set thickness t2, the clearance δs set in (A) is slightly increased. The same test processing is then repeated in order to obtain the maximum clearance δmax capable of processing the thin-walled portion 11 having the set thickness t2 under the predicted processing load Pa. The predicted processing load Pa then employed is set as a tested processing load Pt.

(C) If the portion subjected to the compression processing is broken before being formed into the thin-walled portion 11 under the predicted processing load Pa during the test processing in (A), the clearance δs set in (A) is slightly increased and the same test processing is then repeated. If it is possible to be processed into the thin-walled portion 11 having the set thickness t2, the test processing in (B) is repeated to obtain the maximum clearance δmax and the tested processing load Pt. If the predicted processing load Pa is increased during the repetition of the same test processing performed while slightly increasing the set clearance δs and it is thereby impossible to be processed into the thin-walled portion 11 having the set thickness t2, it is concluded that the thin-walled portion 11 cannot be processed into from the metal base plate having the thickness t1. Thus, processing from the metal base plate 4 having a thickness smaller than the thickness t1 is considered.

(D) In the test processing in (A), if the predicted processing load Pa is increased and it is thereby impossible to be processed into the thin-walled portion 11 having the set thickness t2, the clearance δs set in (A) is slightly decreased and the same test processing is then repeated. If it is possible to be processed into the thin-walled portion 11 having the set thickness t2, the predicted processing load Pa then employed is set as the tested processing load Pt and the clearance δ employed when such processing is achieved is set as the maximum clearance δmax. Also when the portion subjected to the compression processing is broken before forming the thin-walled portion 11 under the predicted processing load Pa during the repetition of the same test processing performed while slightly decreasing the clearance δs, it is concluded that the thin-walled portion 11 cannot be processed into from the metal base plate having the thickness t1. Thus, processing from the metal base plate having a thickness smaller than the thickness t1 is considered.

(E) The minimum clearance δmin capable of processing, without breaking, the metal base plate having the thickness t1 into the thin-walled portion 11 having the set thickness t2 under the tested processing load Pt will be obtained next. From Expression (3), conditions not to cause the breaking of the thin-walled portion 11 will be:

$$\tau t \cdot t2/(t2^2+\delta^2)^{1/2} < \tau max \quad \text{Expression (5)}$$

wherein t2 denotes the set thickness of the thin-walled portion 11; δ denotes the clearance; and τt denotes the shear stress due to the tested processing load Pt along the longitudinal section of the thin-walled portion 11 in the processing direction.

If Expression (5) is transformed about the clearance δ, $$\delta > t2 \cdot (\tau t^2/\tau max^2 - 1)^{1/2} \quad \text{Expression (6)}$$

is obtained. From Expression (6), the minimum clearance δmin capable of processing the thin-walled portion 11 having the set thickness t2 under the tested processing load Pt without causing the breaking thereof is $$\delta min = t2 \cdot (\tau t^2/\tau max^2 - 1)^{1/2} \quad \text{Expression (1).}$$

In Expression (1), the shear stress τt due to the tested processing load Pt along the longitudinal section of the thin-walled portion 11 in the processing direction is a constant obtained from Pt/Sv wherein Sv denotes the longitudinal section area of the vertical plane of the thin-walled portion 11 having the set thickness t2 and Pt denotes the above-described tested processing load Pt actually measured. The set thickness t2 and the shear strength τmax of the metal base plate 4 are known values. Therefore, if the clearance δs is set in a range between the minimum clearance δmin calculated from Expression (1) and the maximum clearance δmax obtained from (B) to (D), the metal base plate 4 having the thickness t1 can be reliably compressed and processed into the thin-walled portion 11 having the set thickness t2 with the tested processing load Pt obtained from (B) to (D).

Within this range, if the clearance δ is set at a clearance δms smaller than the maximum clearance δmax and close to the minimum clearance δmin, the volume of the excess portion to be pushed out toward both the sides is reduced at least as compared with the case where the compression processing is performed with the maximum clearance δmax. Thus, the thin-walled portion 11 having the set thickness t2 can be processed with a processing load Pms smaller than the tested processing load Pt used when processing the thin-walled portion 11 with the maximum clearance δmax. In view of this, the clearance δ between the upper and lower dies 2 and 3 is set at the clearance δms in the present embodiment in order to process the thin-walled portion 11.

Configurations of the lid body 10 including the thin-walled portion 11 formed by the method 1 for cold-forging a thin-walled portion according to the present embodiment and the explosion-proof valve 12 formed at the center of the lid body 10 according to the present embodiment will now be described.

Figure 1:
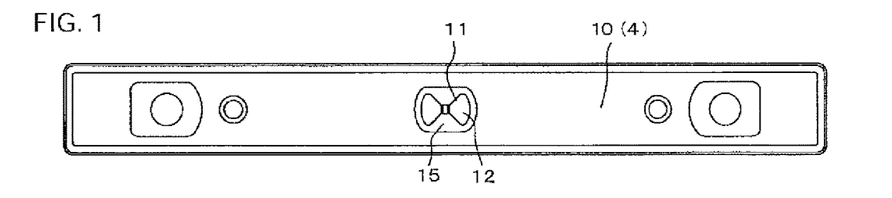
FIG. 1 is a plan view of a lid body 10 including a thin-walled portion 11 formed by a method 1 for cold-forging a thin-walled portion according to an embodiment of the present invention.

The lid body 10 hermetically covers the strip-shaped opening 14a of the battery case 14. Thus, the lid body 10 is formed in a strip shape as shown in FIG. 1. At an approximately center of the lid body 10, the explosion-proof valve 12 is formed by forming the thin-walled portion 11 along the outline of a butterfly-shaped closed loop in a virtual circular region with a diameter thereof being a short-side width of the lid body 10.

Since the explosion-proof valve 12 is formed in the limited virtual circular region at the approximately center of the lid body 10, the explosion-proof valve 12 does not constrain an arrangement space for arranging other components such as electrodes on the lid body 10.

Moreover, since the thin-walled portion 11 is formed along the outline of the butterfly-shaped closed loop, the length of the thin-walled portion 11 is increased as compared with the case where the thin-walled portion 11 is formed along the circular outline in the virtual circular region. Therefore, the area of the cross-section Sθ (see FIG. 10) along the diagonal line of the thin-walled portion 11 at which the maximum shear stress τθ is generated is increased. Consequently, with the tested processing load Pt being the same, the maximum shear stress τθ gets smaller. Thus, the thin-walled portion 11 becomes less likely to break and the minimum clearance δmin calculated from Expression (1) has a smaller width. Accordingly, the setting range of the clearance δms can be widened.

In order to prevent a liquid leakage from the battery case 14, a welding margin 13 provided so as to suspend in a frame shape around a periphery of a bottom surface of the lid body 10 is welded to an inner side surface of the battery case 14 along a periphery of the opening 14a. The lid body 10 is thus fixed to the battery case 14 in a state completely sealing the battery case 14. In order to reduce the entire weight of a secondary battery, on the other hand, the metal base plate 4 to form the lid body 10 is made of not the conventional stainless steel but a lighter aluminum alloy. The aluminum alloy, however, has a small modulus of longitudinal elasticity E. Thus, the aluminum alloy is more likely to bend outwardly due to an internal pressure inside the battery case 14. Moreover, since the above-described welding margin 13 is formed by being pushed out from the thickness direction of the metal base plate 4, the thickness t1 thereof needs to be at least 0.8 mm or greater. Here, the lid body 10 is formed from the metal base plate 4 having a thickness of 0.84 mm.

In order for the thin-walled portion 11 forming the outline of the explosion-proof valve 12 to be broken when an internal pressure inside the battery case 14 is in a range of 0.45 MPa to 1.0 MPa, on the other hand, the set thickness t2 thereof is set at 0.03 mm. More specifically, the thin-walled portion 11 having the processing target set thickness t2 of 0.03 mm is processed by means of compression from the lid body 10 having the thickness t1 of 0.84 mm, which is equal to or greater than ten times the set thickness t2.

Figure 2:
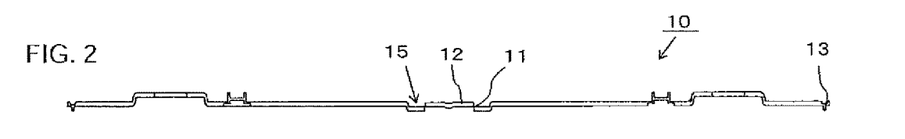
FIG. 2 is a longitudinal cross-sectional view of the lid body 10.
Figure 3:
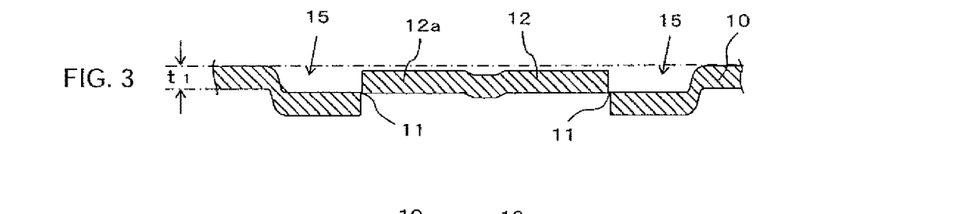
FIG. 3 is an enlarged view of a main part of FIG. 2 illustrating an explosion-proof valve 12 according to an embodiment of the present invention.
Figure 4:
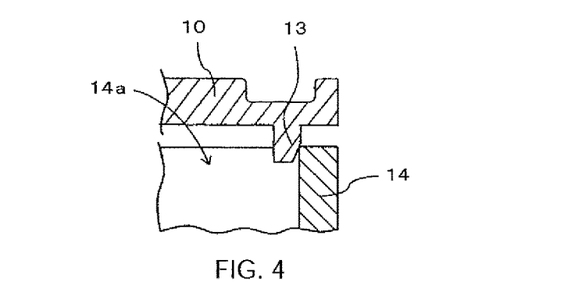
FIG. 4 is an enlarged view of a main part of FIG. 2 illustrating a welding margin 13 of the lid body 10.

As shown in FIGS. 2 and 3, the periphery of the butterfly-shaped explosion-proof valve 12 is surrounded by a ring recessed portion 15 having an oval shape. The surface 12a of the explosion-proof valve 12 protruding toward the outer side of the battery case 14 via the thin-walled portion 11 is exposed on the same plane, via the ring recessed portion 15, as the surface of the lid body 10 positioned at the outer side thereof. Thus, the explosion-proof valve 12 protrudes outwardly from the thin-walled portion 11, i.e., protrudes in a direction along which the breaking of the thin-walled portion 11 occurs more easily due to an internal pressure increase in the battery case 14. Also, since such outward protrusion does not exceed the surface of the lid body 10, the explosion-proof valve 12 has no risk of getting caught on an extraneous material or a finger.

Steps of processing the lid body 10 are as follows. First, the thin-walled portion 11 of the explosion-proof valve 12 is formed from the lid body 10 by the method 1 for cold-forging a thin-walled portion according to the present embodiment. Thereafter, the ring recessed portion 15, the welding margin 13, a pair of electrodes, etc., are formed. The shape of the lid body 10 shown in FIG. 1 is obtained by the press processing.

Figure 6:
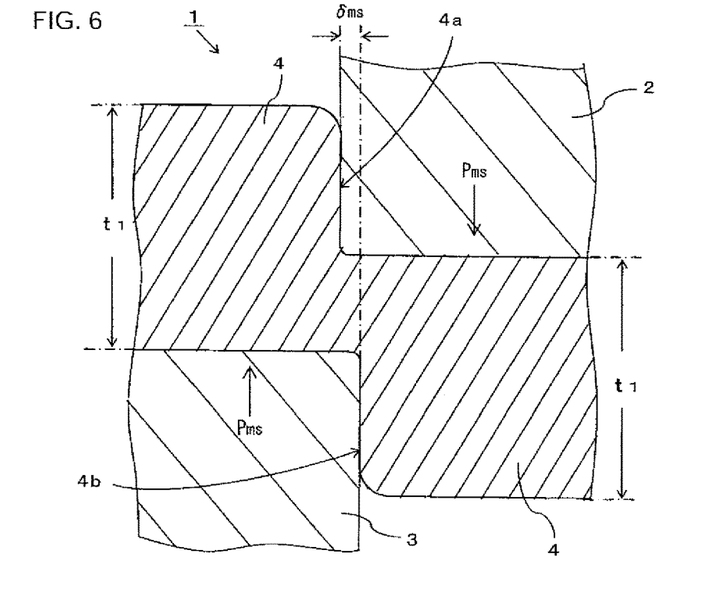
FIG. 6 is an enlarged cross-sectional view of a main part of the method 1 for cold-forging a thin-walled portion during shear processing of the metal base plate 4.
Figure 7:
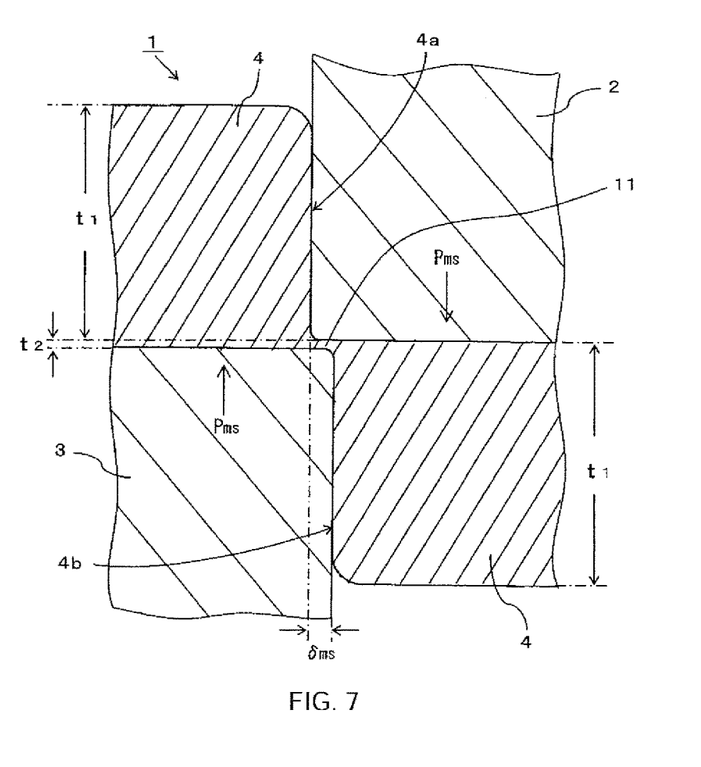
FIG. 7 is an enlarged cross-sectional view of a main part of the method 1 for cold-forging a thin-walled portion, illustrating the cold-forged thin-walled portion 11.

FIGS. 5 to 7 show steps of cold-forging the thin-walled portion 11 from the metal base plate 4 (lid body 10). First, the outline of the blade side surface 2a of the punch 2 and the outline of the blade side surface 3a of the die 3 for forming the thin-walled portion 11 along the outline of the butterfly-shaped explosion-proof valve 12 shown in FIG. 1 are disposed one above the other in a ring shape in an overlapping manner in the vertical direction with a clearance δms therebetween in the horizontal direction. As shown in FIG. 5, the metal base plate 4 for forming the lid body 10 and having the thickness t1 of 0.84 mm is disposed between the punch 2 and the die 3. The minimum clearance δmin not to cause the breaking of the thin-walled portion 11 under the processing load Pms for processing the thin-walled portion 11 having the set thickness t2 of 0.03 mm from the metal base plate 4 made of an aluminum alloy and having the thickness t1 of 0.84 mm is generally smaller than 0.02 mm. Thus, the clearance δms here is set at 0.02 mm.

Subsequently, the processing load Pms (the upper limit thereof is the tested processing load Pt) is applied to the punch 2 downwardly in the direction of the die 3 so as to compress the metal base plate 4 by the overlapped portions of the punch 2 and the die 3 with the clearance δms. Along with the descent of the punch 2 compressing the metal base plate 4, the blade side surfaces 2a and 3a of the punch 2 and the die 3 shear portions of the metal base plate 4 at both the sides of the clearance δms to form sheared surfaces 4a and 4b at both the sides of the clearance δms as shown in FIG. 6, respectively. At the same time, the excess portion of the metal base plate 4 compressed exceeding the elastic region at the area of the clearance δms is pushed out toward both the sides thereof beyond the sheared surfaces 4a and 4b.

During this compression processing, the excess portion of the metal base plate 4 compressed at the area of the clearance δms is extremely small in amount since the clearance δms is minute as small as 0.02 mm. Furthermore, the portions of the metal base plate 4 on both the sides of the area of the clearance δms will not be the excess portion required to be pushed out by the descent of the punch 2. Thus, with the low processing load Pms equal to or smaller than the tested processing load Pt, the metal base plate 4 in the area of the clearance δms can be compressed until achieving the work-hardening thereof and thereby obtaining the thin-walled portion 11 having the set thickness t2 of 0.03 mm as shown in FIG. 7. Moreover, since the excess portion pushed out toward both the sides beyond the sheared surfaces 4a and 4b is extremely small in amount, the excess portion is absorbed by the shrinkage of the metal base plate 4 at both the sides of the thin-walled portion 11 in the elastic region. Thus, no bulging or bending deformation occurs in the portions of the metal base plate 4 at both the sides of the thin-walled portion 11.

EXAMPLES

The method according to the present invention will be described specifically with Examples.

Example 1

A thin-walled portion 21 having the set thickness t2 was cold-forged from a metal base plate having a length of 50 mm, a width of 60 mm, and the thickness t1 of 0.84 mm and made of an aluminum alloy material with a shear strength of 75.4 MPa and an elongation percentage of 22% along the outline of a butterfly-shaped explosion-proof valve 22 at a center thereof. In the step of such cold-forging processing, while varying the clearance δs over which the punch 2 was overlapped with the die 3 and a pressurizing direction clearance t2' between the punch 2 and the die 3 which set the set thickness t2 of the thin-walled portion 21 as a processing target, ten sample plates 20 shown in FIG. 8 were processed for each of such variations. A thickness ts of the thin-walled portion 21 upon the completion of the processing was measured.

Figure 8:
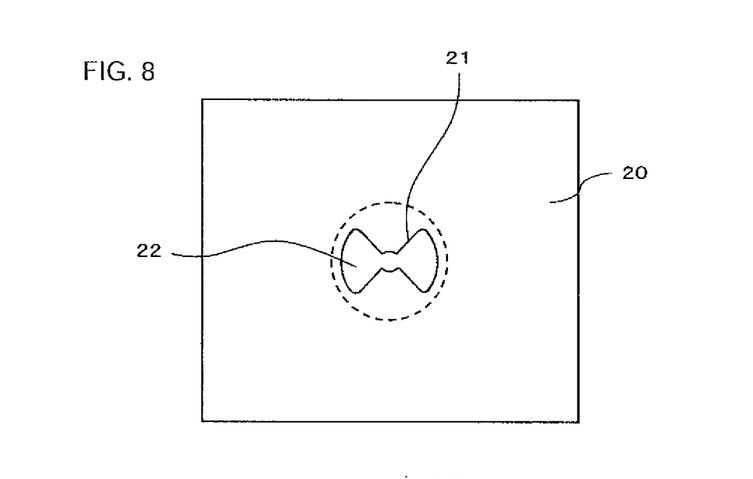
FIG. 8 is a plan view of a metal base plate 20 used for measuring an internal pressure at which a thin-walled portion 21 is broken.

Thereafter, for each sample plate 20 including the thin-walled portion 21 formed therein, both sides of the sample plate 20 excluding a test region surrounded by a circular dotted line in FIG. 8 were interposed by a rubber packing of a pressurization testing device. The sample plate 20 was set such that an inner surface of the test region faced a pressurizing chamber of the pressurization testing device filled with a nitrogen gas. While increasing an internal pressure in the pressurizing chamber up to 1.1 MPa in consideration of an internal pressure increase in the battery case, the internal pressure when the thin-walled portion 21 was broken was measured. The measurement results are shown in Table 1.

TABLE 1

| $t_1$ | mm | 0.84 | 0.84 | 0.84 | 0.84 | 0.84 | 0.84 | 0.84 |
|---|---|---|---|---|---|---|---|---|
| δs | | 0.02 | 0.02 | 0.02 | 0.08 | 0.1 | 0.1 | 0.15 |
| t2' | | 0.03 | 0.05 | 0.06 | 0.03 | 0.03 | 0.03 | 0.03 |

TABLE 1-continued

| ts | | 0 | 0.03 | 0.045 | 0.03 | 0.03 | 0.03 | 0.04 |
|----|-----|---|------|-------|------|------|------|------|
| 1  | Mpa | — | 0.8  | 0.95  | 0.52 | 0.8  | 0.88 | ≥1.1 |
| 2  |     | — | 0.7  | 0.95  | 0.56 | 0.95 | 0.95 | ≥1.1 |
| 3  |     | — | 0.74 | 0.92  | 0.48 | 0.88 | 0.95 | ≥1.1 |
| 4  |     | — | 0.78 | 1     | 0.48 | 0.85 | 0.95 | ≥1.1 |
| 5  |     | — | 0.8  | 1.1   | 0.52 | 0.9  | 0.95 | ≥1.1 |
| 6  |     | — | 0.78 | 1.1   | 0.48 | 0.9  | 0.95 | ≥1.1 |
| 7  |     | — | 0.78 | 1.1   | 0.5  | 0.85 | 0.98 | ≥1.1 |
| 8  |     | — | 0.95 | 1.1   | 0.5  | 0.88 | 0.95 | ≥1.1 |
| 9  |     | — | 0.95 | 1.1   | 0.5  | 0.88 | 0.9  | ≥1.1 |
| 10 |     | — | 0.88 | 1     | 0.48 | 0.95 | 0.95 | ≥1.1 |

As shown in Table 1, when the clearance δs was set at 0.02 mm or smaller, work hardening progressed despite that the descent of the punch 2 and the die 3 had been stopped with the pressurizing direction clearance t2' being left. Consequently, the thickness ts of the thin-walled portion 21 upon the completion of the processing thereof was smaller than the pressurizing direction clearance t2' set at the set thickness t2, thus failing to process the thin-walled portion 21 with high accuracy.

In the cold-forging with the set thickness t2 of 0.05 mm, the clearance δs of 0.02 mm was close to the breaking limit clearance δlim. In the cold-forging with the set thickness t2 of 0.03 mm and with an increased processing load P, the shear stress τθ generated in the pressurized portion due to the processing load P exceeded the shear strength of the sample plate 20, i.e., 75.4 MPa, thereby causing the breaking of the sample plate 20 and thus failing to form the thin-walled portion 21.

When the clearance δs was increased from 0.10 mm to 0.15 mm, on the other hand, the deformation resistance was rapidly increased and the processing load P was thereby increased despite that the pressurizing direction clearance t2' stayed at 0.03 mm. Thus, it can be assumed that the processing load P was getting closer to the limit processing load Pmax capable of pressurizing the punch 2 and the die 3 without causing the damage thereof. When the clearance δs was set at 0.15 mm and the processing load P was removed with the pressurizing direction clearance t2' of 0.03 mm being left, the excess portions pushed out toward both the sides of the thin-walled portion 21 were pushed back by the elasticity of the sample plate 20 at both the sides thereof. Consequently, the thickness ts of the thin-walled portion 21 was increased to 0.04 mm conversely. Therefore, also when the clearance δs was increased to a level at which the processing load P was close to the limit processing load Pmax, the thin-walled portion 21 was unable to be processed with high accuracy. It is to be noted that the thin-walled portion 21 having the thickness ts of 0.04 mm, which had been processed with the processing load P close to the limit processing load Pmax, did not break even at 1.1 MPa which was the maximum pressurization in the pressurization testing device.

When the clearance δs was set in a range of 0.08 mm to 0.10 mm, the pressurizing direction clearance t2' coincided with the thickness ts upon the completion of the processing. Thus, the thin-walled portion 21 having the set thickness t2 was able to be processed with high accuracy. Within this range of the clearance δs, the internal pressure at which the thin-walled portion 21 was broken fell in a range of 0.48 to 0.56 MPa when the clearance δs was set at 0.08 mm. When the clearance δs was set at 0.10 mm, the internal pressure at which the thin-walled portion 21 was broken fell in a range of 0.80 to 0.98 MPa. As the clearance δs was reduced, the internal pressure at which the thin-walled portion 21 was broken was also reduced. With the clearance δs being the same, however, variations among the internal pressures at which the thin-walled portions 21 were broken were small. In other words, while the thin-walled portion 21 was work-hardened and therefore had a physical property different from that of the metal base plate before the processing thereof, the internal pressure at which the thin-walled portion 21 was broken was substantially uniquely determined if the set thickness t2 and the clearance δs were constant. Thus, the explosion-proof valve 22 which will be reliably broken when the internal pressure in the battery case 14 is increased to the set pressure can be manufactured with high quality.

Example 2

With the clearance δs over which the punch 2 and the die 3 were overlapped with each other being fixed at 0.02 mm and with the pressurizing direction clearance t2' between the punch 2 and the die 3 being changed between 0.03 mm and 0.05 mm, ten sample plates each with the thin-walled portion having the set thickness t2 of 0.03 mm and those of 0.05 mm were manufactured each from a steel rigid plate with a length of 50 mm, a width of 60 mm, and the thickness t1 of 0.21 mm.

Thereafter, for each sample plate including the thin-walled portion, both sides thereof excluding the test region surrounded by the circular dotted line in FIG. 8 were interposed by the rubber packing of the pressurization testing device in the same manner as that in Example 1. The sample plate was then set such that an inner surface of the test region faced the pressurizing chamber of the pressurization testing device filled with a nitrogen gas. While increasing an internal pressure in the pressurizing chamber up to 1.1 MPa, the internal pressure at which the thin-walled portion 21 was broken was measured. The measurement results are shown in Table 2 as a comparative example.

TABLE 2

| δs | mm  | 0.02 | 0.02 |
|----|-----|------|------|
| t2 |     | 0.03 | 0.05 |
| 1  | Mpa | 0.22 | 0.48 |
| 2  |     | 0.22 | 0.44 |
| 3  |     | 0.25 | 0.48 |
| 4  |     | 0.24 | 0.46 |
| 5  |     | 0.24 | 0.48 |
| 6  |     | 0.24 | 0.48 |
| 7  |     | 0.24 | 0.48 |
| 8  |     | 0.24 | 0.46 |
| 9  |     | 0.24 | 0.48 |
| 10 |     | 0.24 | 0.46 |

The rigid plate used in Example 2 as the metal base plate was a rigid plate for use in a can-opening lid for a steel beverage can. As compared to 0.84 mm for the thickness of the metal base plate in Example 1, the thickness t1 of this rigid plate was 0.21 mm, i.e., a quarter of the thickness in Example 1. Consequently, the processing load P for forming the thin-walled portion having the set thickness t2 of 0.03 mm was significantly reduced. As shown in Table 2, even with the clearance δs of 0.02 mm (the value caused the breaking of the thin-walled portion during the processing thereof and therefore failed to form the thin-walled portion in Example 1), the thin-walled portion having the set thickness t2 of 0.03 mm was able to be formed.

According to the measurement results in Table 2, even when a steel was employed as a material of the metal base plate, the thin-walled portion having the set thickness t2 was able to be cold-forged with high accuracy. Furthermore, with the clearance δs being the same, the thin-walled portion with a small variation in the internal pressure at which the thin-walled portion was broken was able to be formed.

The rigid plate used in Example 2 is not suitable for use as the lid body 10 of the battery case 14 due to a small thickness thereof (the thickness t1 of 0.21 mm). In an application such as in the can-opening lid of the beverage can where a portion thereof needs to be broken at a predetermined pressure, however, the thin-walled portion can be manufactured from such a rigid plate with high quality since the breaking thereof reliably occurs by a fixed pressure.

In the above-described embodiment, the present invention has been described on the basis of the case where the thin-walled portion of the explosion-proof valve is formed from the lid body of the battery case. However, the present invention can be applied to any processing for forming a thin-walled portion having a set thickness sufficiently smaller than a thickness of a metal base plate in a portion of the metal base plate. According to the present invention, in particular, a thin-walled portion which will be broken by a predetermined force can be formed with high accuracy from a lid body of a can or a can-opening lid of a beverage can.

According to the above-described embodiment, the metal base plate is sheared with the blade side surfaces 2a and 3a of the upper and lower dies 2 and 3. However, as long as the blade side surfaces can form the sheared surfaces at both the sides of the area forming the thin-walled portion, a curved surface R for protecting the blade side surface may be formed in a portion thereof in order to produce durable upper and lower dies 2 and 3.

Moreover, while the present invention is particularly suitable for processing the metal base plate having the thickness t1 whose compression processing rate will be 90% or greater with respect to the set thickness t2 of the thin-walled portion, the method of the present invention can also be used in processing at a compression processing rate smaller than 90%.

While each of the above-described embodiments has been described with the metal base plate made of an aluminum alloy, the metal base plate may be made of other metal materials.

INDUSTRIAL APPLICABILITY

The present invention is suitable for a cold-forging method for forming a thin-walled portion having a set thickness sufficiently smaller than a thickness of a metal base plate in a portion of the metal base plate and an explosion-proof valve integrally formed in a lid body having a large thickness.

REFERENCE SIGNS LIST

1 method for cold-forging thin-wall portion
2 punch (upper die)
2a blade side surface of punch
3 die (lower die)
3a blade side surface of die
4 metal base plate
4a, 4b sheared surface
10 lid body
11 thin-walled portion
12 explosion-proof valve
14 battery case
14a opening of battery case
15 ring recessed portion
20 sample plate
21 thin-walled portion
22 explosion-proof valve

The invention claimed is:

1. A method for cold-forging a thin-walled portion by which a metal base plate having a thickness t1 is subjected to press processing by upper and lower dies to form a thin-walled portion in a portion of the metal base plate, the method comprising:
    setting blade side surfaces of the upper and lower dies for shearing the metal base plate in an overlapping manner with a predetermined clearance δ therebetween in a horizontal direction and setting the metal base plate having the thickness t1 between the upper and lower dies;
    applying a processing load P between the upper and lower dies to form sheared surfaces with the blade side surfaces in the metal base plate along a processing direction while leaving a set thickness t2 therebetween;
    compressing the metal base plate by overlapped portions of the upper and lower dies until work-hardened to form the thin-walled portion with a horizontal width δ and the set thickness t2, which is smaller than the thickness t1 divided by ten, between the sheared surfaces;
    forming a lid body for covering an opening of a battery case for hermetically containing an electrolyte therein from the metal base plate having the thickness t1 and forming at least a portion of an outline of an explosion-proof valve formed in a portion of the lid body by the thin-walled portion; and
    setting the set thickness t2 of the thin-walled portion at a thickness to allow the thin-walled portion to be broken when an internal pressure in the battery case is increased to a predetermined abnormal value.

2. The method for cold-forging a thin-walled portion according to claim 1, comprising:
    obtaining a minimum clearance δmin not to cause breaking of the thin-walled portion under the processing load P used when processing the metal base plate having the thickness t1 into the set thickness t2; and
    setting the clearance δ at a clearance δms with a length at least longer than the minimum clearance δmin and close to the minimum clearance δmin.

3. The method for cold-forging a thin-walled portion according to claim 2, comprising:
    if it is possible to process the metal base plate having the thickness t1 into the set thickness t2 with a tested processing load Pt equal to or smaller than a limit processing load Pmax applied between the upper and lower dies, obtaining the minimum clearance δmin from:

$$\delta min = t2 \cdot (\tau t^2/\tau max^2 - 1)^{1/2}$$

wherein τt denotes a shear stress generated along a vertical plane of the thin-walled portion having the thickness t2 due to the tested processing load Pt and τmax denotes a shear strength of the metal base plate.

4. The method for cold-forging a thin-walled portion according to claim 3, comprising:
    setting the clearance δ used when the metal base plate having the thickness t1 is processed into the set thickness t2 with the tested processing load Pt as a maximum clearance δmax; and
    setting the clearance δ between the minimum clearance δmin and the maximum clearance δmax.

5. The method for cold-forging a thin-walled portion according to claim 1, wherein the thin-walled portion is formed with a width of the clearance δ along a closed loop in a virtual circular region with a diameter thereof being a short-side width of the lid body and a length of the closed loop is longer than a circumference of the virtual circular region.

6. The method for cold-forging a thin-walled portion according to claim 1, wherein the metal base plate is made of an aluminum alloy.

7. The method for cold-forging a thin-walled portion according to claim 1, wherein an outer surface of the explosion-proof valve formed so as to protrude toward an outer side of the battery case from the thin-walled portion is exposed on the same plane as or on an inner side than an outer surface of the lid body surrounding a ring recessed portion formed around the explosion-proof valve via the ring recessed portion interposed therebetween.

* * * * *